(12) United States Patent
Darrell et al.

(10) Patent No.: US 6,188,777 B1
(45) Date of Patent: Feb. 13, 2001

(54) METHOD AND APPARATUS FOR PERSONNEL DETECTION AND TRACKING

(75) Inventors: Trevor Darrell, San Francisco; Gaile Gordon; Michael Harville, both of Palo Alto; John Woodfill, San Francisco; Harlyn Baker, Los Altos, all of CA (US)

(73) Assignee: Interval Research Corporation, Palo Alto, CA (US)

( * ) Notice: Under 35 U.S.C. 154(b), the term of this patent shall be extended for 0 days.

(21) Appl. No.: 09/102,101

(22) Filed: Jun. 22, 1998

Related U.S. Application Data (60) Provisional application No. 60/054,572, filed on Aug. 1, 1997.

(51) Int. Cl.[7] .................................................. G06K 9/00
(52) U.S. Cl. ........................ 382/103; 382/118; 348/169
(58) Field of Search ................................ 382/103, 106, 382/118, 154, 162, 164, 165, 224; 348/169–173

(56) References Cited

U.S. PATENT DOCUMENTS

| 5,550,928 | 8/1996 | Lu et al. ............................. 382/103 |
| 5,581,625 | 12/1996 | Connell ............................. 382/106 |
| 5,912,980 | * 6/1999 | Hunke ............................. 382/103 |

FOREIGN PATENT DOCUMENTS

735509A1   10/1996   (EP) .

OTHER PUBLICATIONS

Darrell, Trevor et al, "Active Face Tracking and Pose Estimation in an Interactive Room", 1996 IEEE, pp. 67–72.
Hasegawa, Osamu et al, "Real–time Parallel and Cooperative Recognition of Facial Images for an Interactive Visual Human Interface", 1994 IEEE, pp. 384–387.
Darrell, T., et al, "A Virtual Mirror Interface using Real–time Robust Face Tracking", 1998 IEEE, pp. 616–621.

* cited by examiner

*Primary Examiner*—Bhavesh Mehta
(74) *Attorney, Agent, or Firm*—Burns, Doane, Swecker & Mathis, L.L.P.

(57) ABSTRACT

Techniques from computer vision and computer graphics are combined to robustly track a target (e.g., a user) and perform a function based upon the image and/or the identity attributed to the target's face. Three primary modules are used to track a user's head: depth estimation, color segmentation, and pattern classification. The combination of these three techniques allows for robust performance despite unknown background, crowded conditions, and rapidly changing pose or expression of the user. Each of the modules can also provide an identity classification module with valuable information so that the identity of a user can be estimated. With an estimate of the position of a target in 3-D and the target's identity, applications such as individualized computer programs or graphics techniques to distort and/or morph the shape or apparent material properties of the user's face can be performed. The system can track and respond to a user's face in real-time using completely passive and non-invasive techniques.

22 Claims, 9 Drawing Sheets

METHOD AND APPARATUS FOR PERSONNEL DETECTION AND TRACKING

This application claims the benefit of U.S. Provisional Ser. No. 60/054,572 filed Aug. 1, 1997.

BACKGROUND OF THE INVENTION

The present invention generally relates to an image detection and identification system, and more specifically to an apparatus and method for personnel detection, background separation and identification. Based upon the detection and/or identification of a person, applications can perform customized information manipulation that is relevant to such information.

The creation of computing environments which passively react to their observers, particularly displays and user interfaces, has become an exciting challenge for computer vision. Systems of this type can be employed in a variety of different applications. In an interactive game or kiosk, for example, the system is typically required to detect and track a single person. Other types of applications, such as general surveillance and monitoring, require the system to be capable of separately recognizing and tracking multiple people at once. To date, research in such systems has largely focused on exploiting a single visual processing technique to locate and track features of a user in front of an image sensor. These systems have often been non-robust to real-world conditions and fail in complicated, unpredictable visual environments and/or where no prior information about the user population was available.

For example, U.S. Pat. No. 5,642,431 discloses a face detection system that uses an image classifier and an output display device. A training process is employed which uses both face and non-face objects stored in a database to determine whether a face is detected. This system, however, is unable to continuously track the user's face and adjust for real-time movements of the physical objects being detected. U.S. Pat. No. 5,532,741 discloses a camera and video system which are integrally combined. A mirror image of a user is displayed back to the user on a CRT. However this system is merely a passive video playback system which is superimposed on a video screen. There is no visual interactive system which processes displayed images or presents specific information on the basis of detected features of a person who is looking at the system.

In addition to detecting and tracking a person in a scene, various types of image processing, or manipulation, can also be employed in the context of the present invention. One possible type of manipulation that can be employed in this regard is the distortion of the image of the person, in particular the person's face, for amusement purposes. This effect has been explored before on static imagery (such as personal computer imaging tools), but has not previously been applied to live video. For instance, U.S. Pat. No. 4,276,570 discloses a method and associated apparatus for producing an image of a person's face at different ages. Images of old and young faces are mapped to one another, and image transformations are determined. Once these results are stored, a camera receives an image of a user's face (possibly a photograph). The data of the person's face is processed with the previously determined image transformations. Based upon the stored data, an "older face" is then digitally superimposed on areas of the younger face to produce an aged face of the user. This system is unable to perform processing in a real-time fashion, for instance on active video signals. Furthermore, this system does not involve any recognition of the person whose image is being shown, or automated face detection.

Thus, a robust system is still needed to perform accurate image processing, personnel recognition and manipulations in a real-time fashion.

A further complicating factor lies in the time frame over which a person is recognized and tracked. At one extreme, short-term tracking of a person is desirable, e.g. the ability to recognize the person from frame to frame as he or she moves within the scene being viewed. At the other extreme, long term tracking, i.e. the ability to recognize the same person over a hiatus of several days, is desirable in certain applications, particularly where interactivity is dependent upon characteristics of individuals. To be complete, the system should also be capable of mid-term tracking, to recognize when a given individual has momentarily left a scene being viewed and then returned.

It is further desirable, therefore, to provide a tracking and identification system which is capable of providing robust performance over each of these possible tracking periods.

SUMMARY OF THE INVENTION

The present invention provides a multi-modal visual person detection and tracking framework which also has the capability to identify persons over various periods of time. Through the use of depth, color and pattern tracking, images of one or more people in a scene can be tracked in real time in a variety of general conditions, with good results. A first module receives stereo image data from cameras and generates a disparity image, preferably through the use of the census algorithm, and locates one or more target regions in the disparity image by a connected components grouping analysis. A second module classifies and tracks each target region through color segmentation. A third module distinguishes and tracks individual facial features located within the target regions, based on grayscale patterns. Each module is able to be utilized individually or in combination with one or more of the other individual modules to locate and track the targets.

In a particular embodiment of the present invention, each module also computes a mode specific description of a user. The mode specific information is combined in a fourth module which estimates the identity of a person whose image has been detected, based upon a database of previously recognized targets. Once the identity of a person is estimated, real-time applications specific to the identified target can be implemented. This feature is also used to increase the robustness of the short-term tracking of an individual.

Another exemplary embodiment of the present invention provides an intelligent monitoring system which discriminates between faces and the background scene, and then tracks the faces in real-time. In addition to the determination of actual facial characteristics, the individual face is able to be identified. The identification of the face allows for execution of an application (i.e., a computer program) according to the identification of an individual from among a set of recent users.

Another exemplary embodiment of the present invention provides a real time virtual mirror comprising a detector which detects, tracks, and identifies faces in real time. The processor then creates a virtual mirror image for display in which the facial features are selectively distorted.

BRIEF DESCRIPTION OF THE DRAWINGS

The features and advantages of the instant invention will be better understood from the description of embodiments illustrated in the following drawings, in which.

DETAILED DESCRIPTION

In its more general aspects, the present invention is directed to the interactive display of information which is based upon computer vision. To achieve this objective, the invention processes image data representative of a viewed scene to detect target regions corresponding to people or other objects of interest in the scene, track those target regions over time, and, in a preferred implementation, identify each person in a target region from among a database of recent users of the system. Based upon this information, appropriate applications are executed. The tracking is carried out over several different time intervals. Short-term tracking takes place over small quantities of time, for example from frame to frame in a video image. Mid-term tracking takes place over slightly longer periods of time, in which a person might momentarily leave the scene being viewed and then return, e.g. up to the length of a full day. Long-term tracking, which is primarily based upon person identification, occurs over longer periods, e.g. weeks, months and the like, in which conditions such as lighting, clothing, etc. might change.

To facilitate an understanding of the invention, it will be initially described with particular reference to its implementation in a virtual mirror which processes the image of a single person. It will be appreciated, however, that the practical applications of the principles which underlie the invention are not limited to entertainment devices of this type. Rather, the invention will find utility in any environment in which it is desirable to distinguish and, optionally identify, one or more faces in a scene being viewed and perform an operation that is based upon identified features, such as image manipulation. This invention, for example, also has application in other forms of interactive entertainment, telepresence/virtual environments, and intelligent terminals which respond selectively according to the presence, pose and identity of a target.

Figure 1:
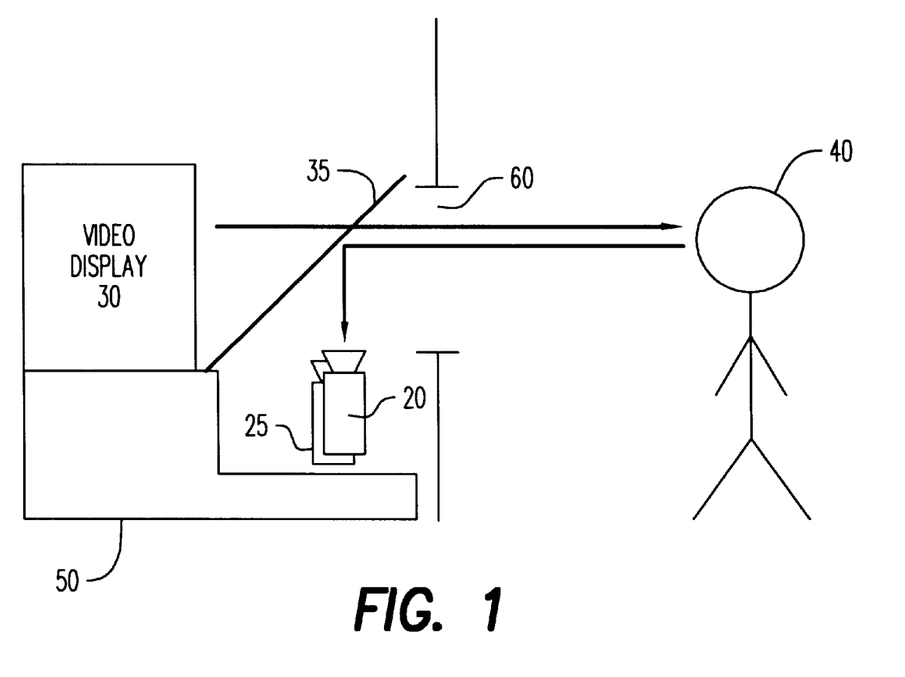
FIG. 1 is a block diagram of a hardware implementation of an interactive display embodiment of the invention.

Referring to an embodiment of the invention depicted in FIG. 1, a virtual mirror system is implemented by locating cameras 20 and 25 along the same optical axis as a video display 30, using a half-silvered mirror 35 to split the optical paths of the cameras from that of the display. For stereo processing, multiple cameras are employed to observe a user 40 through a viewing aperture 60: a primary color camera 20 is mounted in the center of the imaging frame and at least one additional camera 25 is mounted off-axis. While two cameras are shown in exemplary embodiments of the invention, it will be appreciated that additional cameras can be added to provide different perspective views, as needed. The cameras 20 and 25 sense the image of a scene through the half mirror 35, so that the user 40 can view a video monitor 30 while also looking straight into (but not seeing) the cameras. In this particular embodiment, a video image from the primary camera 20 is displayed on the monitor located on a base 50, to create a virtual mirror effect. When used as an entertainment device, the video image can be selectively distorted as it is being displayed on the monitor.

Figure 2:
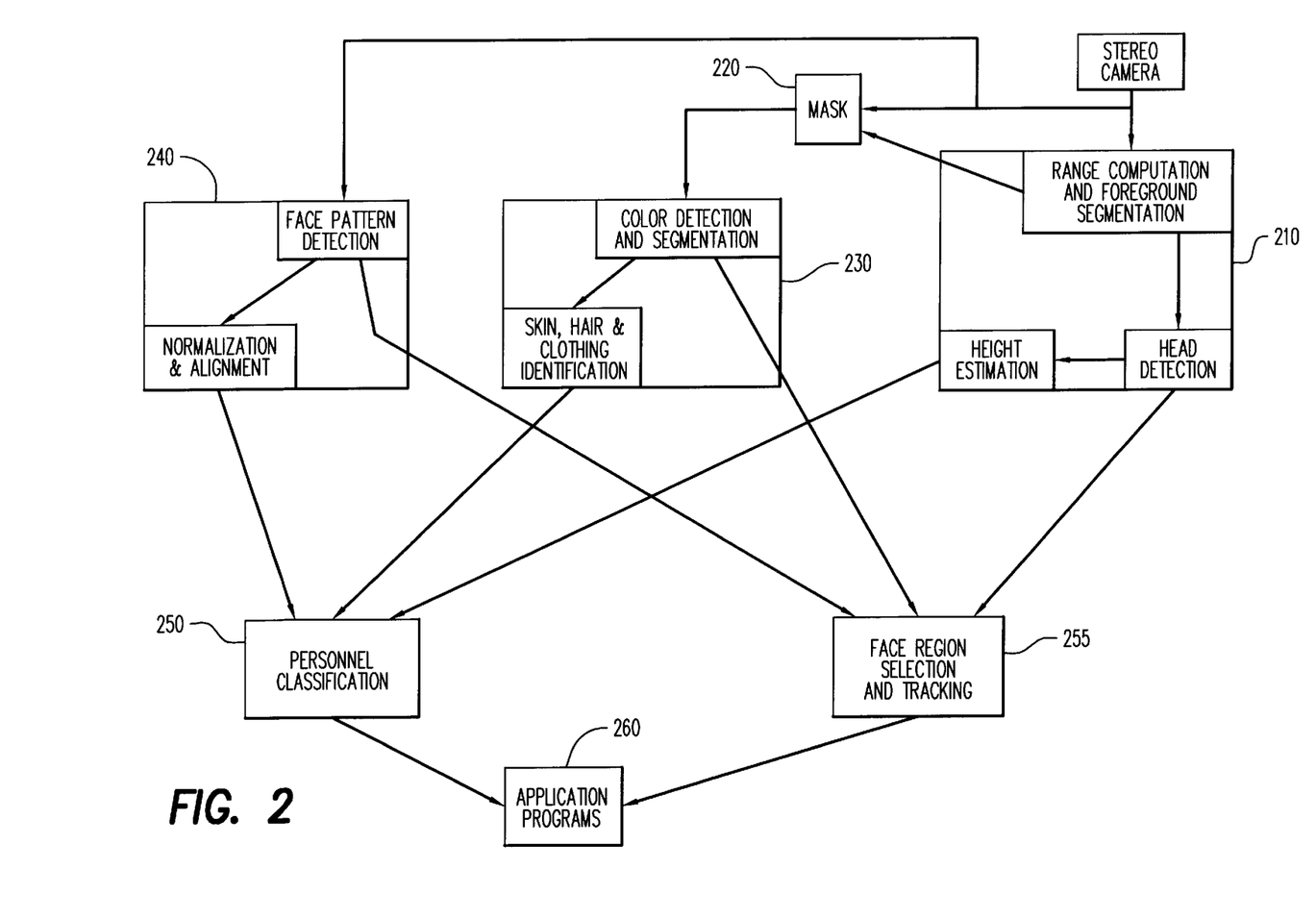
FIG. 2 is a block diagram of the manner in which the different image tracking elements of an exemplary embodiment of the invention are employed.

The system for processing the video signals from the cameras and generating the display is shown in FIG. 2. Referring thereto, four primary modules are used to track a user's position and estimate the identity of the user from among previous users: a range computation module 210, a color detection and segmentation module 230, a face pattern classification module 240, and a personnel classification module 250. Classification, grouping and tracking of image pixels is carried out independently in each of the three modules 210, 230 and 240, and the results obtained by one module are used to refine or validate decisions made in another module.

In the operation of the system, the video signals from the cameras 20 and 25 undergo dense real-time stereo processing to estimate a user's silhouette, as defined by a region of slowly varying range, or depth. Each region in the image that is estimated to correspond to an individual in the scene is identified as a target region. The use of multiple fixed cameras allows for easy segmentation of an image of a target 40 from other people and background objects. Additionally, the range computation module 210 can be used to estimate metric descriptions of the object before the cameras, e.g. an individual's height. The color detection and segmentation module 230 detects regions of flesh tone in a target region. The color detection and segmentation module 230 can also estimate the color of the skin, clothes and hair of a person in the scene. The face pattern classification module 240 is used to discriminate head regions from hands, legs, and other body parts. The results of these three modules are integrated in: a further module 255 to provide an estimate of one or more face regions in the image. With continual knowledge of the location of the target's head in 3-D, application programs 260 which employ this type of information can be executed. For instance, graphics techniques to distort and/or morph the shape or other visual properties of the user's face can be applied. As a further feature of the invention, the personnel identification module 250 can store face patterns and, based upon the observed body metrics and color information, estimate the identity of the user. On the basis of the personnel identification and the tracking of the face region, a different type of application 260 that is responsive to the detected information can be executed.

The range computation module 210 receives raw video data from the two cameras 20 and 25, and estimates the distance to people or other objects in the image, using dense stereo correspondence techniques. Binocular views, as embodied in the present invention, provide information for determining the distance to elements of a scene. Using conventional stereo vision processing, two simultaneously captured images are compared to produce a disparity (inverse depth) image in which nearby scene elements are represented by large disparity values and distant elements by small values. The disparity image is generated by determining, for each pixel in one image, the displacement to its corresponding pixel in the other image.

One issue of concern in determining stereo correspondence is that pixels from two cameras that correspond to the same scene element may differ due to both camera properties such as gain and bias, and to scene properties such as varying reflectance distributions resulting from slightly differing viewpoints. The use of the census correspondence algorithm overcomes these potential differences between images by taking a non-parametric approach to correspondence, and is therefore preferred over more conventional processing techniques. As employed within the present invention, the census algorithm determines the similarity between image regions, not based on inter-image intensity comparisons, but rather based on inter-image comparison of intra-image intensity ordering information.

Figure 3:
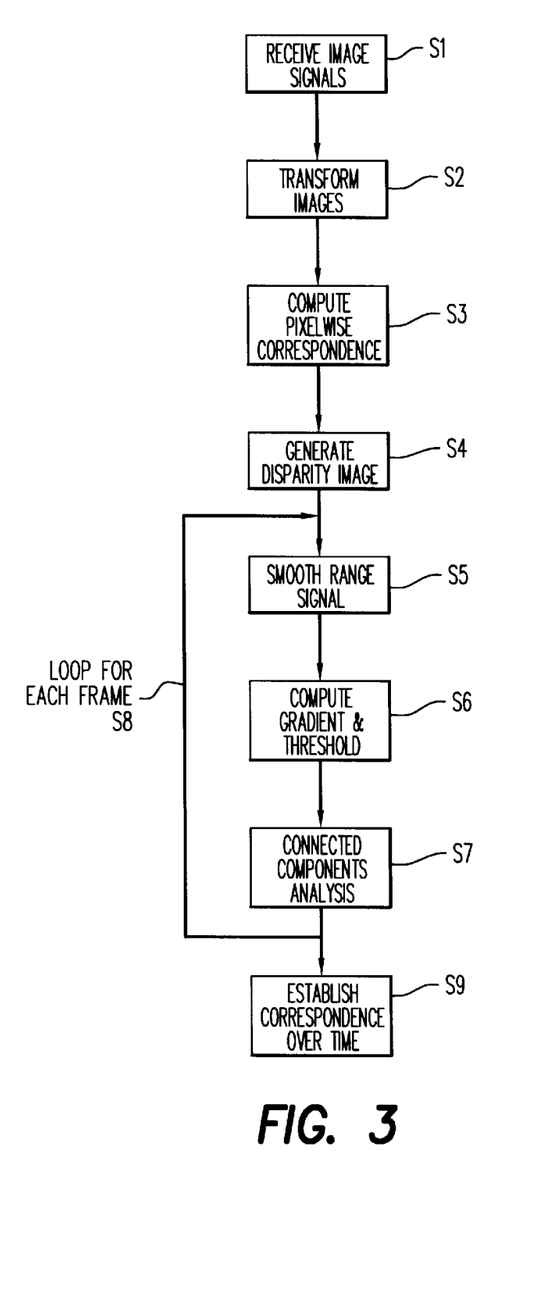
FIG. 3 is a flow chart of the depth estimation module of the present invention.

The census algorithm which can be employed in the context of the present invention is described in detail, for example, in the article entitled "Non-parametric Local Transforms for Computing Visual Correspondence", *Proceedings of the Third European Conference on Computer Vision,* May 1994, by R. Zabih et al. The census algorithm described hereinafter is for the case in which two cameras are utilized. It will, however, be apparent that this algorithm could be expanded to accommodate more than two cameras. Referring to FIG. 3, the input images (S1) from the cameras are transformed so that each pixel represents its local image structure (S2). Second, the pixelwise correspondence between the images is computed (S3) so as to produce a disparity image (S4).

The census algorithm maps each pixel in an intensity image to a bit vector, where each bit represents the ordering between the intensity of pixel and that of a neighboring pixel. Thus, a pixel at the top of an intensity peak would result in a homogenous (all ones) bit vector indicating that its intensity is greater than those of its neighboring pixels. Two census bit vectors in different images can be compared using the Hamming distance, i.e., by counting the number of bits that differ. For each pixel in one image, the correspondence process of finding the best match from within a fixed search window in the other image, is performed by minimizing locally summed Hamming distances. The displacement to the best match serves as the disparity result for a pixel.

In one embodiment of the invention, the census algorithm can be implemented on a single PCI card, multi-FPGA reconfigurable computing engine, for example, of the type described in the article "Real-time Stereo Vision on the PARTS Reconfigurable Computer", *IEEE Proceedings; Symposium on Field-Programmable Custom Computing Machines,* April 1997, by J. Woodfill et al. This stereo system is capable of computing 24 stereo disparities on 320 by 240 pixel images at 42 frames per second, or approximately 77 million pixel-disparities per second. The generated disparity image can be down-sampled and mode-filtered before results are passed to the range detection and segmentation module 210.

From the disparity image determined by the census algorithm, specific target silhouettes (i.e., tracked individuals) are extracted from the depth information by selecting human-sized surfaces and tracking each region until it moves out of the scene being imaged. This extraction technique proceeds in several stages of processing. To reduce the effects of low confidence stereo disparities, the raw range signal is first smoothed using a morphological closing operator (S5), and the response of a gradient operator is then computed on the smoothed range data. The gradient response is thresholded at a critical value, based upon the observed noise level in the disparity data. This creates regions of zero value in the image where abrupt transitions occur, such as between people who are located at at different distances from the camera. A connected-components grouping analysis is then applied to regions of smoothly varying range, resulting in the selection of contiguous regions whose area exceeds a minimum threshold (S7).

The above steps S1–S7 are repeated with each new pair of video frames obtained from the video cameras 20 and 25 (S8). Correspondences are established between regions through time on the basis of similar size and 3-D centroid location (S9). Each region is tracked until it leaves a defined work space or is occluded. Depth information is used to isolate a target's silhouette from the background, so that the color and face detection modules are not confused by clutter from background content or other people in the scene.

The union of all connected, smoothly varying range regions constitutes a boolean mask 220 which is then used in conjunction with the image data that is provided to the color detection and classification module 230. In addition to providing user silhouettes, the range computation module 210 is able to provide an independent estimate of the head position and size. The head position is estimated using the maxima of the target's silhouette as computed from the range component discussed above. Size is estimated by measuring the width of the peak of the range component identified as the head. The range module and the face pattern classification module (discussed below) are also used to constrain the size of the head. If the estimated real size of the head is not within one standard deviation of average head size or the face pattern classification does not track a facial area, the size of the head is set to the projection of average size.

In addition, estimates of body metrics for a targeted individual can be performed in the range computation module 210. Examples of metrics which can be used to distinguish individuals from one another include height, shoulder breadth, limb length, and the like. These estimated metrics are input into the personnel classification module 250, as mode specific information, to further aid in the determination of the viewer's identity. In the case of height, for example, the individual's height is estimated to be proportional to the product of the height of the target's silhouette above the optical center of the system and the range of the person, when the imaging geometry is such that the cameras are parallel to the ground plane. If this is not the case, then height can be computed using a more general camera calibration procedure.. Alternatively, height can be estimated without knowledge of the range, for example by using a wide angle view and a ground plane model.

Disparity estimation, segmentation, and grouping are repeated independently at each time step, so that range silhouettes are tracked, in short term, frame-to-frame increments, based on position and size constancy. The centroid and three-dimensional size of each new range silhouette is compared to silhouettes from the previous time step. Short-term correspondences are indicated using an approach that starts with the closest unmatched region. For each new region, the closest old region within a minimum threshold is marked as the correspondence match.

Within the foreground depth region of a particular target, it is useful to mark and track regions of homogenous color, particularly skin color. This is done through the use of a classification strategy which matches skin hue, but is largely invariant to intensity or saturation, to provide robustness under different lighting conditions and absolute amounts of skin pigment in a particular person.

In one approach, color segmentation processing is applied to images obtained from the primary camera 20. Referring to the flow chart of FIG. 4, each image received at Step S13 is initially represented with pixels corresponding to the red, green, and blue channels of the image, and is converted into a "log color-opponent" space (S14). This space can directly represent the approximate hue of skin color, as well as it's log intensity value. Specifically, (R,G,B) tuples are converted into tuples of the form (1(G),1(R)−1(G),1(B)−(1(R)+1(G))/2), where 1(x) indicates a logarithm function. For reasons of numerical precision, it is preferable to use a base ten logarithm function, followed by a scalar multiplier greater than 10. Typically, 1(x) 10 * log10(x), where log10 (x) is the base ten logarithm. For further information in this regard, reference is made to Fleck et al, "Finding Naked People", European Conference on Computer Vision, Vol. 11, pp. 592–602, 1966.

Figure 4:
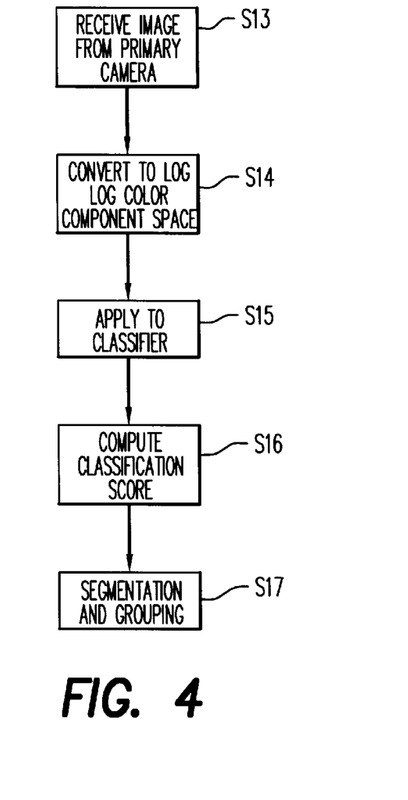
FIG. 4 is a flow chart of the color segmentation module of the present invention.

Either a Gaussian prior probability model, or a K-Nearest Neighbor classifier is used to model example data labeled as skin or non-skin (S15). For the Gaussian case two class models are trained, and when a new pixel is presented for classification the likelihood ratio P(skin)/P(non-skin) is computed as a classification score (S16). In the Nearest Neighbor case, the classification score is computed to be the average class membership value (1 for skin, 0 for non-skin) of the K nearest training data points to the new pixel. Proximity is defined in the log color-opponent space.

In another exemplary embodiment of the invention, in the interest of computational efficiency at run-time, a lookup table can be precomputed for all input values, quantizing the classification score (skin similarity value) into 8 bits and the input color channel values to 6, 7 or 8 bits. This corresponds to a lookup table which ranges between 256K and 16 MB of size. This information can be stored as a texture map for cases in which the computer graphic texture mapping hardware supports the ability to apply "pixel textures", in which each pixel of an input image being rendered generates texture coordinates according to its RGB value. Otherwise, a traditional lookup table operation can be performed on input images with the main CPU. The use of texture mapping hardware for color detection can offer dramatic speed advantages relative to conventional methods.

Figure 5:
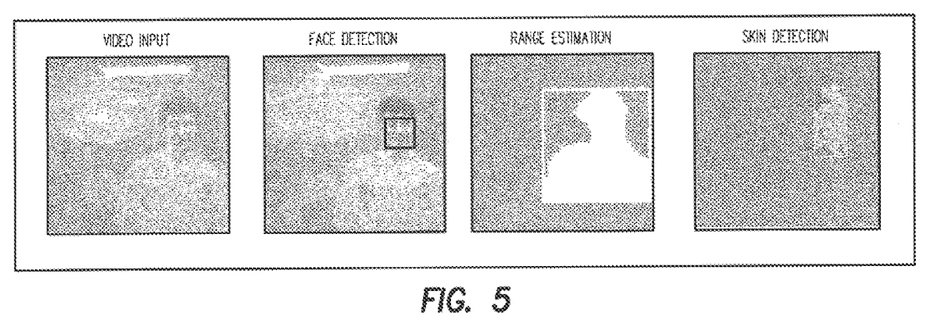
FIG. 5 illustrates exemplary pictorial images of the state of the video signal as it is being processed.

After the skin/non-skin results are obtained from the lookup table, segmentation and grouping analysis are performed on the classification score image (S17). The same tracking algorithm as described above for range image processing is used, i.e. morphological smoothing, thresholding and connected components computation. In this case, however, the low-gradient mask from the range module is applied before smoothing. As shown in FIG. 5, the color detection and segmentation module 230 searches for skin color within the target range. This restricts color regions to be identified only within the boundary of range regions; if spurious background skin hue is present in the background it will not adversely affect the shape of foreground skin color regions. Connected component regions are tracked from frame to frame with the constraint that temporal correspondence is not permitted between regions if their three-dimensional size changes more than a threshold amount.

In each frame, the median hue and saturation of the skin, clothing and hair regions is calculated for input to a person classification algorithm in the personnel classification module 250. These computations are based on the identification of each target as described above. For the skin color computation, the connected component corresponding to the target silhouette is used to mask the original color data. The median hue and saturation is calculated over all pixels in the masked region. Hair and clothing color analyses are performed in the same manner. The determination of the hair region starts with the target's silhouette and removes the pixels identified by the skin color computation. Only the head region of the target's silhouette is considered, which is estimated as all points in the silhouette above the bottom of the face target as determined by the skin color data. The determination of the clothing color uses the inverse approach.

Once the description of the skin, hair and clothing colors are estimated, they are input into the personnel classification module 250, where they are stored in a database of recent users, for mid- and long-term tracking purposes. More particularly, if a person whose image is being tracked should step out of the viewed scene and then return later that same day, the combination of skin, hair and clothing colors can be used to immediately identify that person as one who had been tracked earlier. If the person does not return until the next day, or some time later, the clothing colors may be different. However, the skin and hair colors, together with the estimated height of the person, may still be sufficient to adequately distinguish that person from the other recent users.

To distinguish a head from hands and other body parts, pattern recognition methods which directly model statistical appearance are used in the face pattern classification module 240. In one example, the appearance of "faces" vs. "non-faces" is modeled via a neural network or Gaussian mixture-model. Such an approach is described in the articles "Neural Network-Based Face Detection", *Proc. IEEE Conference on Computer Vision and Pattern Recognition*, 1996, by Rowley et al. and "Example-based Learning for View-Based Human Face Detection", *Proceedings of the ARPA IU Workshop '94*, 1994, by Sung et al. This module reports the bounding box of the face region in the input image, masked by the foreground depth region, as illustrated in FIG. 5. Face detection per se, is reliable across many different users and imaging conditions, but is relatively slow, and requires that a frontal view of the face be present. For real-time tracking and/or when the target is not facing in direct frontal pose, tracking via the face pattern classification module 240 alone can be error-prone. In concert with color tracking module 230 and the range computation module 210, however, much more robust performance is obtained.

More particularly, face detection is initially applied over the entire image. If a region corresponding to a face is detected, it is passed on to the integration module 255 as a candidate head location. Short term tracking is performed in the module 240 for subsequent frames by searching within windows around the detected locations in the previous frame. If a face is detected in a window, it is considered to be in short-term correspondence with a previously detected face. If no face is detected in the new frame, but the face detected in a previous frame overlapped a color or range region, the face detection module is updated by the integration module 255 to move with that region. Thus, faces can be discriminated in successive frames even when another positive face detection may not occur for several frames.

Once color regions or range-defined head candidates have been found within the target's silhouette from one frame to the next, the results obtained by face pattern classification module 240 identify which regions correspond to the head. When a face is detected, the overlapping color or range region is marked, and the relative offset of the face detection result to the bounding box of the color or range region is recorded in the integration module 255. Regions are tracked from frame to frame as in the range case, with the additional constraint that a size constancy requirement is enforced: temporal correspondence is not assumed between regions if their three-dimensional size is considerably smaller or larger.

When a region does change size dramatically, an additional test is performed to determine if the target region merged or split with another region relative to the previous frame. This may occur, for instance, if a person being tracked occasionally touches his or her face with his or her hand. If this has occurred, the face detection label and subregion position information is maintained, despite the merge or split. An assumption is made that the face did not move, in order to determine which color region to follow. This is done by computing the screen coordinates of the face subregion in the previous frame and re-evaluating which regions it overlaps in the current frame. If two regions have merged, the tracking follows the merged region, with offset such that the face's absolute position on the screen is the same as the previous frame. If two regions have split, the tracking follows the region closest to its position in the previous frame.

Once the face is detected and able to be tracked, in accordance with one implementation of the invention, this information is fed to an application program 260 which manipulates the display itself. For instance, the application may use video texture mapping techniques to apply a distortion and morphing algorithm to the user's face. For discussion purposes it is assumed that texture and position coordinates are both normalized to be over a range from 0 to 1. A vertex is defined to be in "canonical coordinates" when position and texture coordinates are identical. To construct a display, a background rectangle to cover the display (from 0,0 to 1,1) in canonical coordinates is generated. This creates a display which is equivalent to a non-distorted, pass-through, video window.

To perform face distortions, a mesh is defined over the region of the user's head. Within the external contour of the head region, vertices are placed optionally at the contour boundary as well as at evenly sampled interior points. Initially all vertices are placed in canonical coordinates, and set to have neutral base color.

Figure 6A:
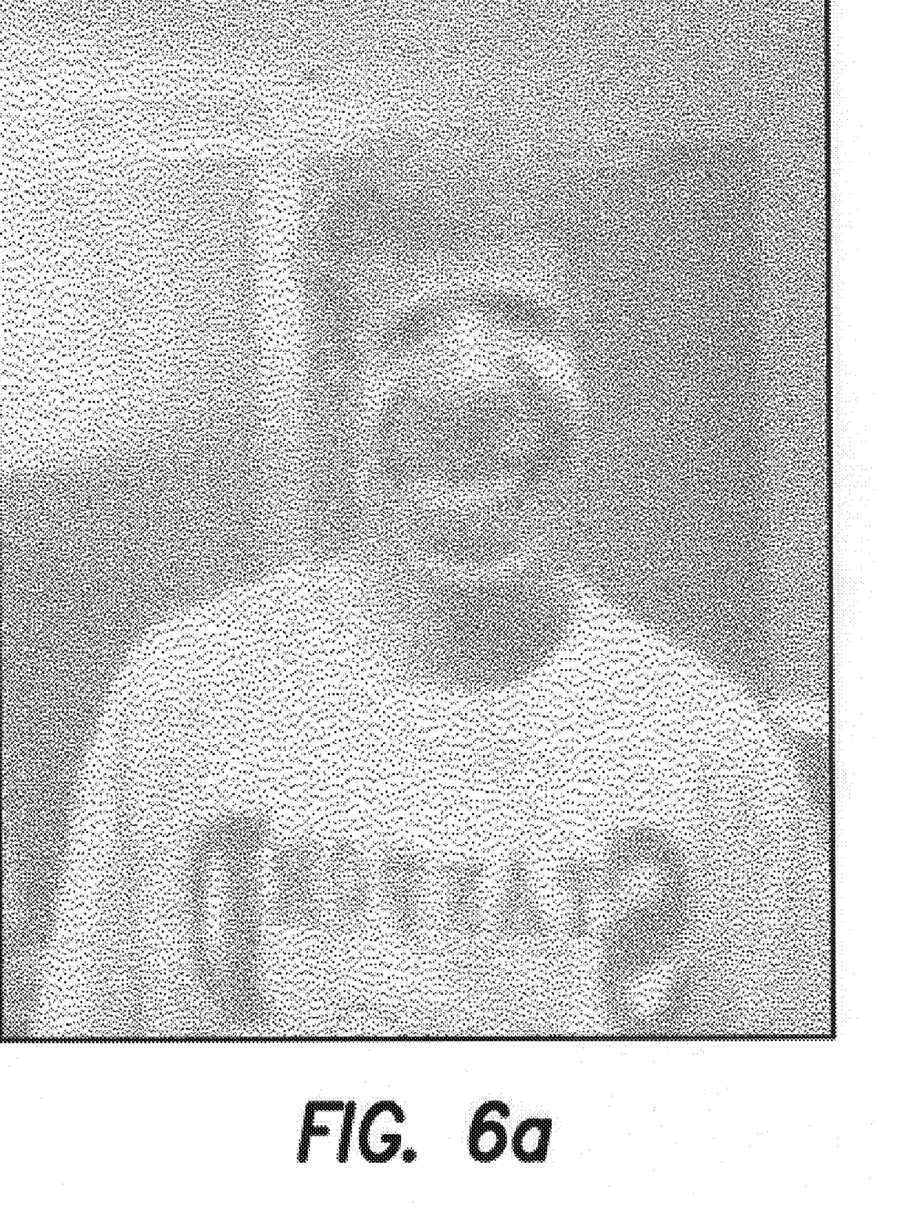
FIGS. 6(a), 6(b), 6(c), 6(d) and 6(e) illustrate several exemplary ways in which human faces can be distorted in the virtual mirror embodiment of the present invention.
Figure 6B:
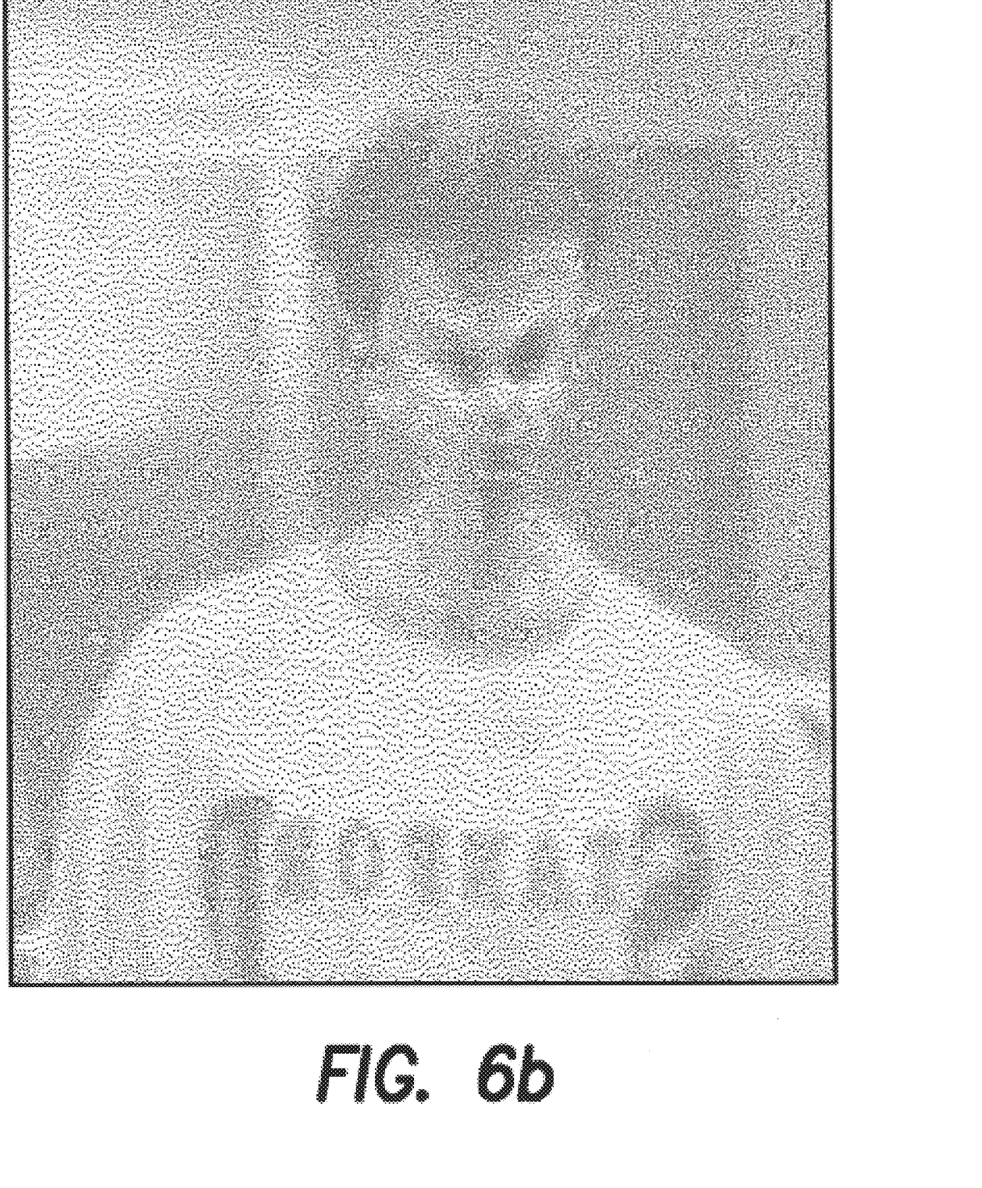
Figure 6C:
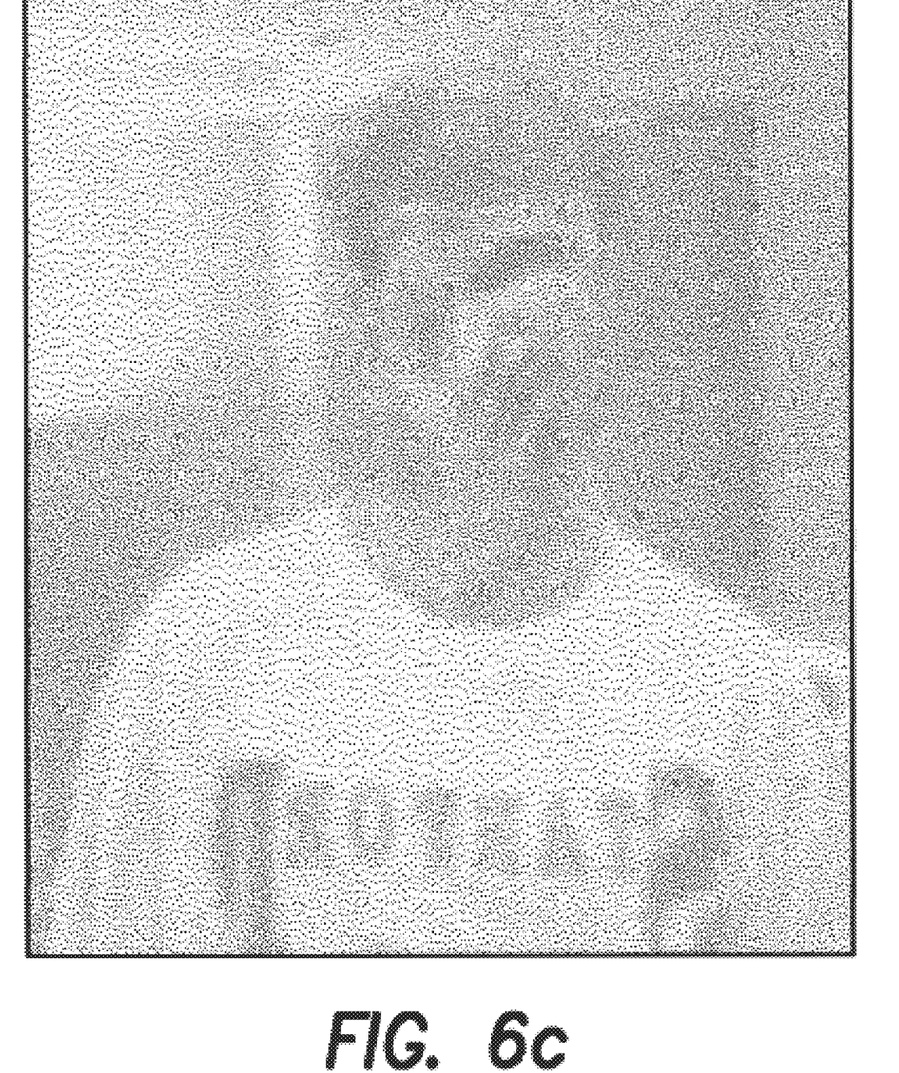
Figure 6D:
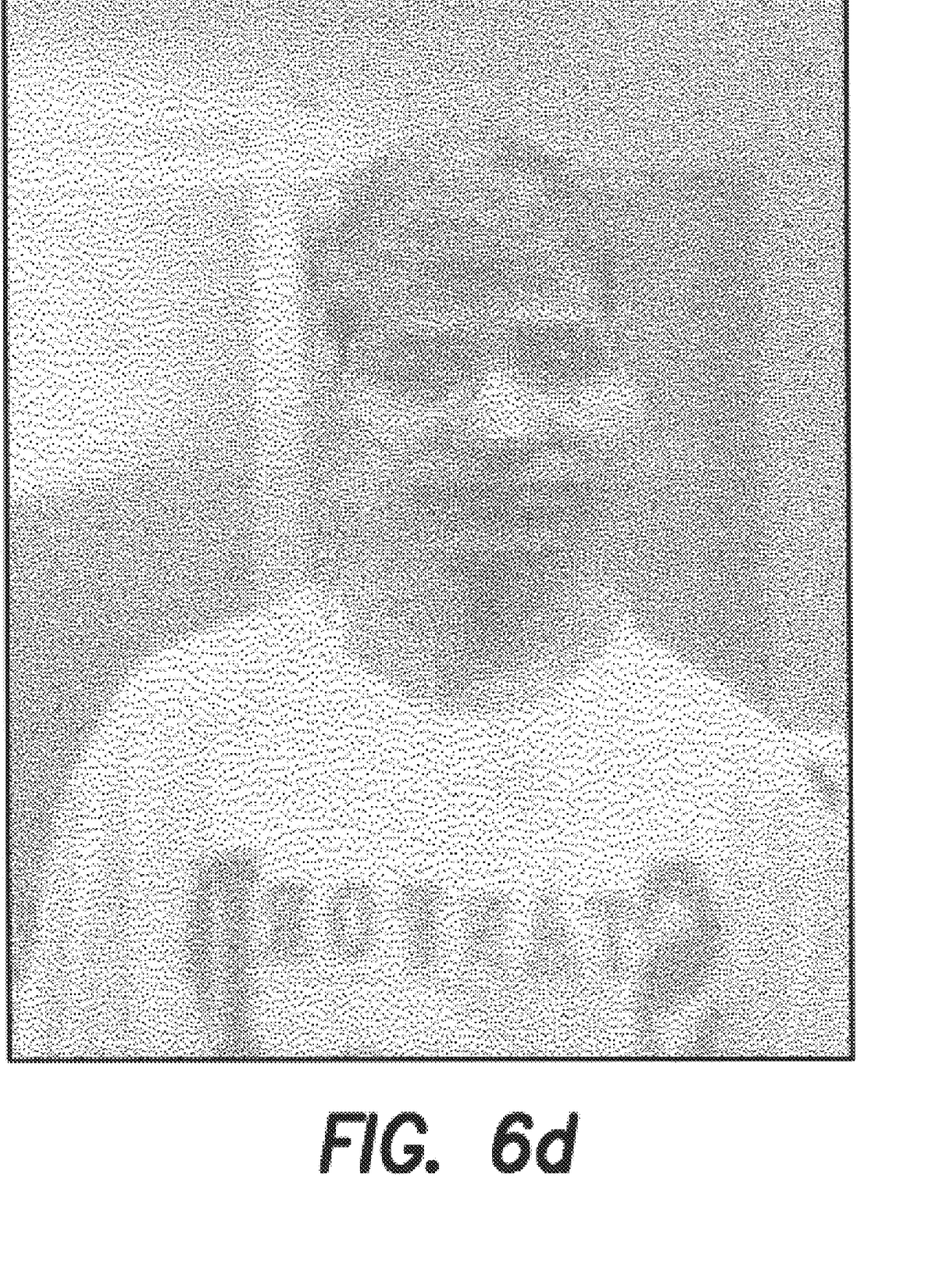
Figure 6E:
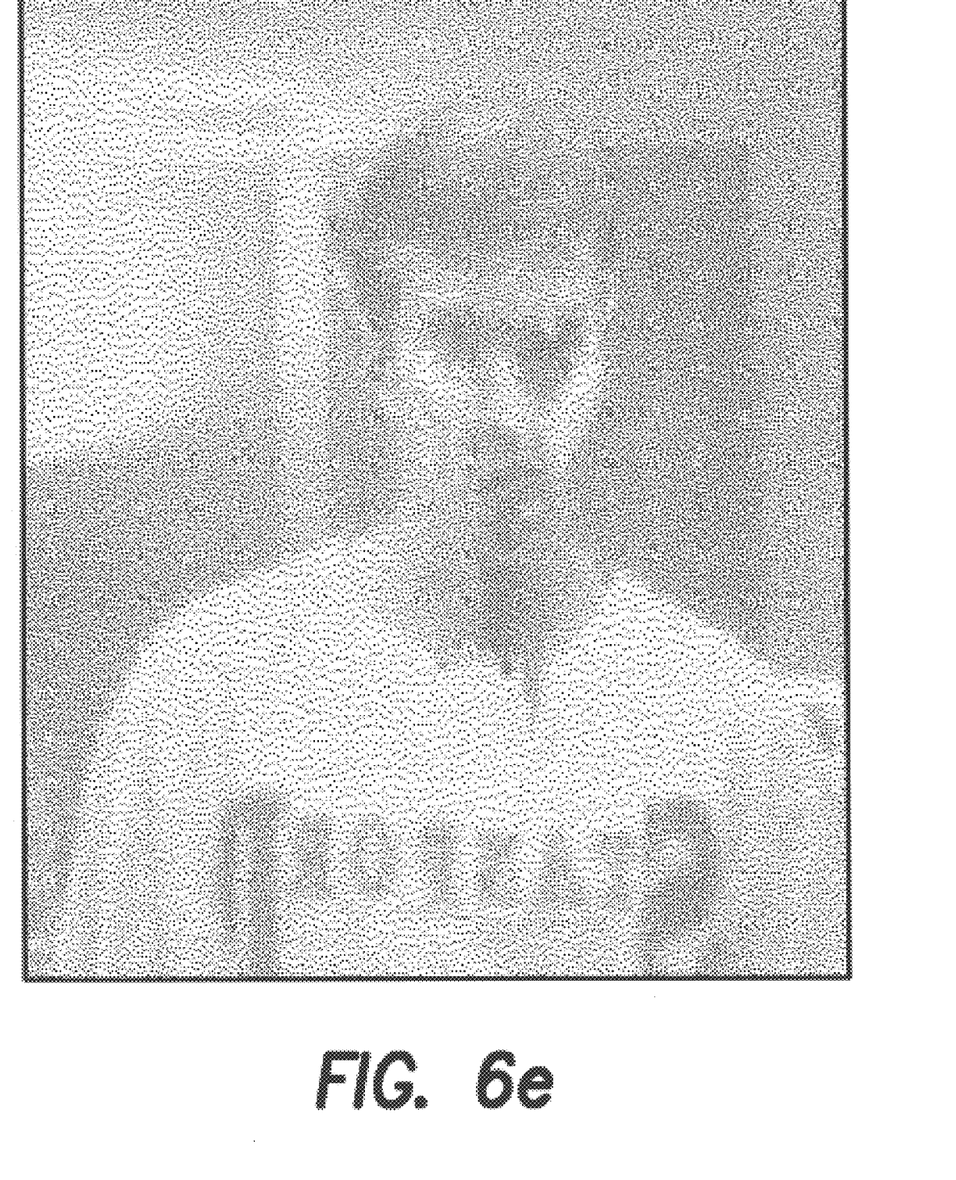

Color distortions may be effected by manipulating the base color of each vertex. Shape distortions are applied in one of two modes: parametric or physically-based. In the parametric mode distortions are performed by adding a deformation vector to each vertex position, expressed as a weighted sum of fixed basis deformations. These bases can be constructed so as to keep the borders of the distortion region in approximately canonical coordinates, so that there will be no apparent seams to the video effect. In the physically-based mode, forces can be applied to each vertex and position changes are computed using an approximation to an elastic surface. As a result, a vertex can be "pulled" in a given direction, and the entire mesh will deform as it were a rubber sheet. FIGS. 6a–6d illustrate four examples of various types of basis deformations, and FIG. 6e depicts a physically-based distortion effect applied to the face of the user shown in FIG. 5. Specifically, FIG. 6a shows spherical expansion, FIG. 6b shows spherical shrinking, FIG. 6c illustrates a swirl effect, FIG. 6d shows lateral expansion, and FIG. 6e depicts a vertical sliding effect.

The weight parameters associated with parametric basis deformations can vary over time, and can be expressed as a function of several relevant variables describing the state of the user: the distance of the user to the screen; their position on the floor in front of the display, or their overall body pose. In addition the weight parameters can vary randomly, or according to a script or external control. Forces for the physically-based model can be input either with an external interface, randomly, or directly in the image as the user's face touches other objects or body parts.

In another embodiment of the invention, when a region is identified as a face, based on the face pattern detection algorithm of the face pattern classification module 240, the face pattern (a grayscale sub-image) in the target region can be normalized and passed to the personnel classification system 250. For optimal classification, the scale, alignment, and view of detected faces should be comparable. There is a large amount of variety in the face regions identified by a system of the type described in the previously mentioned article by Rowley et al., which does not employ normalization. For instance, faces are often identified which exhibit a substantial out-of-plane rotation. This is a good property for a detection system, but in the context of identification, it makes the problem more difficult. Several steps are used in the process of the present invention to achieve a set of geometrically normalized face patterns for use in classification. This process provides enough normalization to demonstrate the value of face patterns in a multi-modal person identification system. First, all the target regions are scaled to a common size. Each identified face target is compared with an example face at a canonical scale and view (e.g., upright and frontal) and face targets which vary radically from this model are discarded. The comparison is performed using simple normalized correlation. During the comparison with the canonical face the location of the maximum correlation score is recorded and the face pattern is translated to this alignment. While the face identification algorithm discussed above can be used to identify a face, other more powerful identification algorithms could also be employed such as an eigenface technique.

As discussed previously, when a target is momentarily occluded or exits the scene, the short term tracking will fail since the position and size correspondences in each module will no longer apply. In order to track a target over medium and long term time scales, statistical appearance models are used. Each module computes an estimate of certain user attributes, as discussed above with respect to FIG. 2. If a target is occluded for a medium amount of time, attributes such as body metrics, skin, hair and clothing are used to determine the identity of a target. However, if an object is occluded or missing for a long amount of time (i.e., more than one day) attributes that vary with time or on a day to day basis cannot be utilized for identification purposes.

Therefore, when a person is observed, an attempt is made to determine if the individual has been previously tracked. A previously identified individual is most likely to have generated the new observations if a calculated probability is above a minimum threshold. In order to determine the identity of a target, likelihood is integrated over time and modality: at time t, the identity estimate is $$u^* = \text{ag max}_j P(U_j | O_t)$$

where $$P(U_j | O_t) = P(U_j | F_0, \ldots F_t, H_0, \ldots H_t, C_0, \ldots C_t)$$

and where $O_t$ is the cumulative user observation through time t, $F_t$, $H_t$, and $C_t$ are the face pattern, height and color observations at time t, and $U_j$ are the saved statistics for person j.

Time is restarted at t=0 when a new range silhouette is tracked. For purposes of this discussion, $P(U_j)$ is assumed to be uniform across all users. With Bayes rule and the assumption of modality independence:

$$u^* = \arg\max_j (P(F_0, \ldots F_t|U_j) \, P(H_0, \ldots H_t|U_j) P(C_0, \ldots C_t|U_j))$$

Since the observations are independent of the observed noise in sensor and segmentation routines, the posterior probabilities at different times may be considered independent. With this consideration, probability in each modality can be incrementally computed by the following equation:

$$P(F_0, \ldots F_t|U_j) = P(F_0, \ldots F_{t-1}|U_j) P(F_t|U_j).$$

Probability is computed similarly for range and color data.

Mean and covariance data for the observed user color data is collected, as is mean and variance of user height. The likelihoods $P(F_t|U_j)$ and $P(C_t|U_j)$ are computed assuming a Gaussian density model. For face pattern data, the size-normalized and position-normalized mean pattern from each user is stored, and $P(F_t|U_j)$ is approximated with an empirically determined density which is a function of the normalized correlation of $F_t$ with the mean pattern for person j.

Like multi-modal person detection and tracking, multi-modal person identification is more robust than identification systems based on a single data modality. Body metrics, color, and face pattern each present independent classification data and are accompanied by similarly independent failure modes. Although face patterns are perhaps the most common data source for current passive person classification methods, body metrics and color information are not normally incorporated in identification systems because they do not provide sufficient discrimination to justify their use alone. However, combined with each other and with face patterns, these other modalities can provide important clues to discriminate otherwise similar people, or help classify people when only degraded data is available in other modes.

Once the viewer has been identified, for instance from a database of recent viewers of the system, that data can be provided to, or otherwise used to control, the application program 260. For example, a person could sit down in front of a computer and be detected by the imaging system. The personnel identification module could then identify the person sitting before the computer and launch a specific application program that the individual always desires to have running. Alternatively, the person's identification can be fed to the computer's operating system to cause it to display that individual's personalized computer desktop, e-mail, etc. In still another possible application, a kiosk could be set up to run different applications for different viewers. For example, a kiosk for selling items could present items more likely to appeal to a male or female depending on the person standing before the kiosk.

The preceding discussion of the present invention was presented in the context of a single user of interest in the scene being imaged. However, the principles which underlie the invention can be used to track multiple users simultaneously and apply appropriate applications, e.g. distort each user's face. To implement such a feature, a separate target region is determined for each person of interest in the scene, based upon the range and color information, and the foregoing techniques are applied to each such target region. In the virtual mirror embodiment, for example, one user's face can be morphed or combined with other users of the system in the present or past, to add features to the user's face. Distorting or morphing the user's face onto other characters, virtual or real, is also possible.

The above described interactive display can be implemented using three computer systems, e.g., one personal computer and two workstations, an NTSC video monitor, stereo video cameras, a dedicated stereo computation PC board, and an optical half-mirror. Depth estimates are computed on the stereo PC board based on input from the stereo cameras, which is sent over a network from the PC to the first workstation at approx 20 Hz for 128×128 range maps. On this workstation color video is digitized at 640×480, color lookup and connected components analysis is performed at 10–20 Hz, and the output image constructed by applying the acquired video as a texture source for the background rectangle and the face mesh (at 10–20 Hz). A second workstation performs face detection routines at 128× 128 resolution at approximately (2–3 Hz), using either it's own digitized copy of the color video signal, or using a sub-sampled source image sent over the network. It should also be understood that while the above mentioned hardware implementation can be used with the present embodiments of the invention, other less expensive basic hardware could also be used.

While the present invention has been described with respect to its preferred embodiments, those skilled in the art will recognize that the present invention is not limited to the specific embodiment described and illustrated herein. Different embodiments and adaptations besides those shown herein and described, as well as many variations, modifications and equivalent arrangements, will be apparent or will be reasonably suggested by the foregoing specification and drawings without departing from the substance or scope of the invention. For example, the disclosed system achieves it's robust performance in detection, tracking, and identification through the combination of three specific visual modalities: range, color, and pattern. Additional independent modalities could serve to further increase robustness and performance. For instance, the computation of optical flow or visual motion fields could assist in short term tracking by providing estimates of object trajectory as well as improve figure/ground segmentation.

The presently disclosed embodiments are therefore considered in all respects to be illustrative, and not restrictive, of the principles which underlie the invention. The invention is indicated by the appended claims, rather than the foregoing description, and all changes that come within the scope and range of equivalents thereof are intended to be embraced therein.

What is claimed is:

1. An image detecting and tracking system, comprising:
   at least two image sensing devices, each of said image sensing devices producing image data;
   a first tracking module which receives the image data, generates a disparity image based upon the image data from each of said image sensing devices, and determines a target region in said disparity image;
   a second tracking module which classifies and tracks said target region through color segmentation; and
   a third tracking module which distinguishes individual features and tracks identified features which are located within a classified target region.

2. The image detecting and tracking system of claim 1, wherein said third tracking module distinguishes individual features based upon intensity patterns in a sensed image.

3. The image detecting and tracking system of claim 1, wherein said first tracking module determines the relative distances of respective target regions in the sensed image.

4. The image detecting and tracking system of claim 1, wherein said first tracking module locates a target area using a connected components grouping analysis.

5. The image detecting and tracking system of claim 4, wherein said image data is received in the form of video frames and said connected components grouping analysis is performed for each pair of video frames received from said image detecting devices.

6. The image detecting and tracking system of claim 1, wherein said classification in said second module is performed with a Gaussian prior probability model.

7. The image detecting and tracking system of claim 1, wherein said first tracking module generates a boolean mask based upon a determined target region, and said second and third tracking modules only process image data contained within the mask.

8. The image detecting and tracking system of claim 7, wherein said boolean mask corresponds to the silhouette of a person detected in the sensed image.

9. The image detecting and tracking system of claim 1, wherein said individual features are human features.

10. A method for image detecting and tracking comprising:

detecting an image via two separate optical paths;

receiving image data from said paths, generating a disparity image based upon the image data from each of said paths, and determining a target region in said disparity image;

classifying and tracking said target region through color segmentation;

detecting facial patterns within said target region based on said image data; and     displaying a image of the facial patterns detected within said target region.

11. The image detecting and tracking method of claim 10 wherein said disparity image is generated using the census algorithm.

12. The image tracking and detecting method of claim 10, wherein said step of locating a target area uses a connected components grouping analysis.

13. The image tracking and detecting method of claim 12, wherein said image data is received in the form of video frames and said connected components grouping analysis is performed for each set of video frames received from said cameras.

14. The image tracking and detecting method of claim 10, wherein said classification employs a Gaussian prior probability model.

15. The image tracking and detecting method of claim 10, wherein said displayed facial patterns are distorted relative to the originally detected image.

16. An identification system, comprising:

at least two image sensing devices, each of said image sensing devices producing image data;

a first tracking module which receives the image data from each of said image sensing devices, locates and tracks a target area in the sensed image and provides a range identity description;

a second tracking module which classifies said target area through color segmentation and outputs a color identity description;

a third tracking module which distinguishes individual features located within said classified target area and outputs a face identity description; and     a classification module which receives said range identity description, said color identity description and said face identity description, and estimates an identity of a person whose image is contained within said target area.

17. The identification classification system of claim 16, wherein said range identity description is a height of the target area and is estimated from a generated disparity image.

18. The identification classification system of claim 16, wherein said color identity description is a skin color and hair color designation.

19. The image detecting and tracking system of claim 1, wherein said disparity image represents depth information.

20. The image detecting and tracking system of claim 3, wherein said relative distances are distances between the sensing devices and said respective target regions.

21. The image detecting and tracking method of claim 10, wherein said disparity image represents depth information.

22. The identification classification system of claim 17, wherein said disparity image is generated from said image data from each of said image sensing devices and represents depth information.

* * * * *